United States Patent
Kim

(10) Patent No.: US 9,235,269 B2
(45) Date of Patent: Jan. 12, 2016

(54) SYSTEM AND METHOD FOR MANIPULATING USER INTERFACE IN VEHICLE USING FINGER VALLEYS

(71) Applicant: Hyundai Motor Company, Seoul (KR)

(72) Inventor: Sung Un Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 131 days.

(21) Appl. No.: 14/032,525

(22) Filed: Sep. 20, 2013

(65) Prior Publication Data

US 2014/0168061 A1    Jun. 19, 2014

(30) Foreign Application Priority Data

Dec. 18, 2012 (KR) .......................... 10-2012-0148816

(51) Int. Cl.
*G06F 3/01* (2006.01)

(52) U.S. Cl.
CPC ...................................... *G06F 3/017* (2013.01)

(58) Field of Classification Search
CPC ..................................................... G06F 3/017
USPC .......... 345/702, 173, 174, 176, 156; 382/114, 382/177, 159; 701/208
See application file for complete search history.

(56) References Cited

U.S. PATENT DOCUMENTS

| | | | |
|---|---|---|---|
| 2008/0059578 A1* | 3/2008 | Albertson et al. | 709/204 |
| 2008/0071481 A1  | 3/2008 | Algreatly | |
| 2008/0122799 A1* | 5/2008 | Pryor | 345/173 |
| 2009/0284469 A1* | 11/2009 | Hsieh et al. | 345/158 |

FOREIGN PATENT DOCUMENTS

| | | |
|---|---|---|
| KR | 10-2004-0036593 A | 4/2004 |
| KR | 10-2012-0058996 | 6/2012 |
| KR | 10-1189633 | 10/2012 |

* cited by examiner

*Primary Examiner* — Shaheda Abdin
(74) *Attorney, Agent, or Firm* — Mintz Levin Cohn Ferris Glovsky and Popeo, P.C.; Peter F. Corless

(57) ABSTRACT

A method for manipulating a user interface within a vehicle using finger valleys includes receiving, by a controller, a captured image and detecting finger valleys from the captured image. In addition a hand gesture is recognized by the controller using the finger valleys and a vehicle equipment operation that corresponds to the recognized hand gesture is selected. Accordingly, the passenger is able to manipulate a vehicle steering wheel with one hand and look forward while operating many in-vehicle electronic devices with simple motions of the other hand, thereby improving passengers' convenience and driving safety.

14 Claims, 3 Drawing Sheets

SYSTEM AND METHOD FOR MANIPULATING USER INTERFACE IN VEHICLE USING FINGER VALLEYS

CROSS-REFERENCE TO RELATED APPLICATION

This application claims priority to and the benefit of Korean Patent Application No. 10-2012-0148816 filed in the Korean Intellectual Property Office on Dec. 18, 2012, the entire contents of which are incorporated herein by reference.

BACKGROUND (a) Field of the Invention

The present invention relates to a system and method for manipulating a user interface to control in-vehicle equipment by recognizing hand gestures using passenger finger valleys within a vehicle.

(b) Description of the Related Art

Modern vehicles are equipped with many electronic devices for passenger convenience, including a navigation system, a hands-free mobile phone system, and the like, as well as conventional electronic devices such as a radio and an air conditioner.

Conventional in-vehicle electronic devices provide a user interface through assigned buttons, and the use of a touch screen has been developed in recent years. A passenger can manipulate these devices by directly touching the user interfaces with their hands or other objects (e.g., a pen, a stylus, and the like). Since such an operation is based on the passenger's gaze and hand motions, it may hinder safe driving. Accordingly, when the passenger can maintain a wide viewing angle and good posture while operating the electronic devices, safe driving may be ensured. Hence, there is a need for the development of a user interface technology which does not hinder safe driving.

Accordingly, a system has been developed that controls vehicle functions by recognizing images of a passenger's hands using a 3D (three-dimensional) camera (e.g., imaging device) and a webcam. This system controls the vehicle functions without the need for the passenger's field of vision, and is therefore expected to promote safe driving. In particular, the 3D camera delivers depth information, from which poses and 3D motion data can be obtained regardless of hand posture.

However, it is difficult for the webcam to extract hand poses or 3D gestures since the webcam operates on the basic principle of delivering 2D (two-dimensional) information. In a 2D image-based system, feature points can be found based on color and brightness information only, and the feature points are less distinguishable due to external lighting.

The above information disclosed in this section is only for enhancement of understanding of the background of the invention and therefore it may contain information that does not form the prior art that is already known in this country to a person of ordinary skill in the art.

SUMMARY

The present invention provides a system and method which control many electronic devices within a vehicle by extracting a passenger's finger valleys from image information captured by a 2D imaging device (e.g., a camera, webcam, video camera, etc.), and recognizing hand gestures. An exemplary embodiment of the present invention provides a method for manipulating a user interface within a vehicle using finger valleys. The method may include receiving a captured image of a passenger; detecting finger valleys from the captured image, and recognizing a hand gesture using the finger valleys; and selecting a vehicle equipment operation that corresponds to the recognized hand gesture.

The detecting of finger valleys from the captured image and recognizing of a hand gesture using the finger valleys may include: recognizing an image of the passenger's hand from the captured image of the passenger; detecting finger valleys from the hand image; extracting a 3D posture from the finger valleys; generating the trajectory of the 3D posture; and recognizing hand gesture from the trajectory of the 3D posture.

The recognizing of a hand gesture from the trajectory of the 3D posture may include: determining whether a hand gesture matching the trajectory of the 3D posture is stored in an information database; in response to determining a matching hand gesture stored in the information database, recognizing the trajectory of the 3D posture as a hand gesture.

Additionally, the method may further include determining whether a request has been made to use a hand gesture recognition function, prior to the receiving of a captured image of the passenger, and in response to determining a request to use the hand gesture recognition function, receiving a captured image of the passenger.

The method may further include: determining whether there is a request to terminate the hand gesture recognition function; and in response to determining a request to terminate the hand gesture recognition function, terminating the hand gesture recognition function.

Another embodiment of the present invention provides a system for manipulating a user interface within a vehicle using finger valleys, the system including: an image capture unit configured to capture a passenger image; an image storage unit configured to store an image captured by the image capture unit; an information database configured to store recognizable hand gestures; and an electronic control unit configured to operate vehicle equipment operations based on an input signal from the image capture unit and accumulated image information stored in the image storage unit, wherein the electronic control unit may be configured to execute a series of commands for performing the method.

The system may further include: an input unit configured to receive from the passenger a request signal to use a hand gesture recognition function, and deliver the request signal to the electronic control unit; and an output unit configured to display the content of a vehicle equipment operation of the electronic control unit.

According to the method for manipulating a user interface using a passenger's finger valleys according to the exemplary embodiment of the present invention, cost reduction may be achieved since a passenger's hand gesture may be extracted by a 2D camera.

Moreover, according to the method for manipulating a user interface using a passenger's finger valleys according to the exemplary embodiment of the present invention, the recognition of hand postures and motions may be completed with improved reliability since the degree of freedom of hand posture is increased and a constant distance may be maintained between finger valleys regardless of hand posture.

Further, according to the method for manipulating a user interface using a passenger's finger valleys according to the exemplary embodiment of the present invention, various hand gestures may be accurately recognized since hand postures, such as tilting or overturning the hand, as well as up-down and left-right motions of the hand, may be extracted.

Accordingly, the passenger may be able to manipulate the steering wheel with one hand while looking forward and operating many in-vehicle electronic devices with simple motions of the other hand, thereby improving passengers' convenience and driving safety.

DETAILED DESCRIPTION

Figure 1:
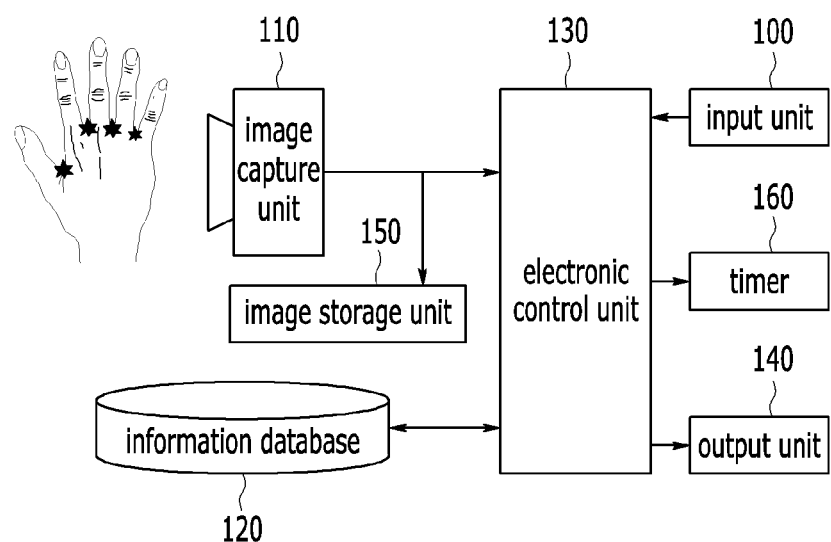
FIG. 1 is an exemplary view schematically showing an in-vehicle user interface system using finger valleys according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An exemplary embodiment of the present invention will be described in details hereinafter with reference to the accompanying drawings. As those skilled in the art would realize, the described embodiments may be modified in various different ways, all without departing from the spirit or scope of the present invention. In addition, the size and thickness of each component shown in the drawings are arbitrarily shown for purposes of understanding and ease of description, but are not to be understood as limiting the present invention.

FIG. 1 is an exemplary view schematically showing a user interface system using finger valleys in accordance with an exemplary embodiment of the present invention. Referring to FIG. 1, a user interface (UI) system using finger valleys may include an input unit 110, an image capture unit 110, an information database 120, a timer 160, an image storage unit 150, an electronic control unit (ECU) 130, and an output unit 140.

The input unit 100 may include a plurality of buttons, a touch screen, etc. Input, as used herein, refers to generating an input signal via a button or touch screen, and other input methods such as voice, gesture, etc. may also be used.

The image capture unit 110 may include a 2D imaging device (e.g., a camera), an optical sensor, an ultrasonic sensor, an image sensor, and so on. The image sensor is most advantageous for accurate recognition of hand postures, and the image capture unit 110 may be configured to capture a color image or a black-and-white image. The image capture unit 110 may be disposed next to, below, or above the steering wheel, to be positioned at a location to capture hand images. In addition, the image storage unit 150 may be configured to cumulatively store frames of images captured by the image capture unit 110. The timer 160 checks time.

Figure 3:
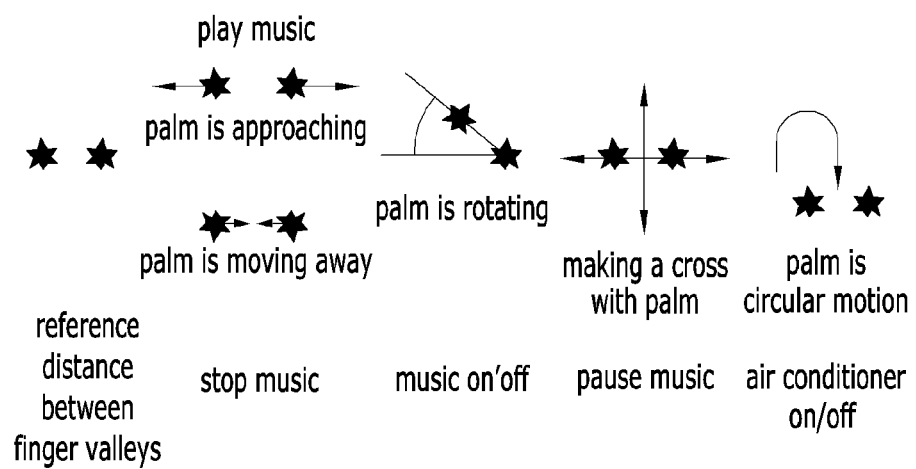
FIG. 3 is an exemplary illustration of an operation corresponding to a finger valley motion according to an exemplary embodiment of the present invention.

The information database 120, executed by the ECU, may be configured to store hand gestures that correspond to the trajectories of a variety of predefined 3D hand postures. Moreover, the information database 120 may be configured to store equipment operating information that corresponds to the hand gestures, when required. For example, as shown in FIG. 3, vehicle equipment operations that may be selected for hand gestures, such as the palm is approaching, the palm is moving away, the palm is rotating, making a cross with the palm, and circling the palm, may include play music while driving, stop music, music on/off, pause music, and air conditioner on/off. The stored hand gestures may be preset for generally defined gestures. For example, the preset hand gestures may take the forms shown in FIG. 3, and may take many other forms of hand gestures.

Further, the information database 120 may be configured to store hand gestures registered by the passenger. The passenger may select the trajectories of a variety of 3D hand postures and store the trajectories as hand gestures. In other words, each passenger may input a personalized hand gesture to prevent recognition error when the trajectories of 3D hand postures are recognized as hand gestures.

The electronic control unit 130 may be configured to detect a hand gesture using an image input from the image capture unit 110 and images stored in the image storage unit 150. For this, color images or infrared images may be used. When using color images, a hand image may be detected by extracting skin color or motion. When using infrared images, a hand image may be detected by extracting an image as bright as or brighter than skin color, or by detecting a differential image of a motion.

In addition, the electronic control unit 130 may be configured to extract a contour from the hand image, and detect fingers and the center of the hand. Points with high curvature on the contour may be detected as the fingers, and the center of gravity or center point of the hand image may be defined as the center of the hand. Finger valleys may be defined by backward curvature detection by detecting the curvature of the fingertips. In other words, the finger valleys may be detected based on the inflection points of the contour.

Once finger valleys are defined, the electronic control unit 130 may be configured to determine whether the palm is approaching, moving away, moving up-down or left-right, rotating etc. based on the distances between the finger valleys and two-dimensional spatial arrangement thereof. For example, the electronic control unit 130 may be configured to extract a hand image from images captured from the image capture unit 110, and detect finger valleys from the hand image. Then, the electronic control unit 130 may be configured to extract a 3D posture, and detect the trajectory of the 3D posture from the finger valleys.

This method may be modified in various ways, and other methods may be used to detect the trajectory of a 3D posture. For example, the electronic control unit 130 may be configured to perform image processing based on a human body image. In other words, peripheral images may be removed from an image of the passenger's body, and the head, torso, each arm, each hand, and each leg in the extracted image may be separately modeled. Finger valleys may be extracted from the modeled image of the hand, and the trajectory of a 3D posture may be detected using the finger valleys.

When necessary, the electronic control unit 130 may be configured to detect finger valleys by comparing the current frame of the passenger's hand image captured from the image capture unit 110 with accumulated image frames stored in the image storage unit 150, and obtain the trajectory of a 3D posture, which is formed for a predetermined time, from the finger valleys. Additionally, the electronic control unit 130 may be configured to recognize a hand gesture from the trajectory of a 3D posture by referencing the information of the information database 120. The predetermined time refers to a time required to form the trajectory of a 3D posture, which is enough to recognize a hand gesture, and may be determined using the timer 160.

Furthermore, the electronic control unit 130 may be configured to determine whether a hand gesture matching the obtained trajectory of the 3D posture is stored in the information database 120. In response to determining a matching hand gesture, the electronic control unit 130 may be configured to recognize the stored trajectory of the 3D posture as a hand gesture of the passenger. On the other hand, when a matching hand gesture is not stored in the information database 120, the trajectory of the 3D posture of the passenger may be rendered unidentifiable and therefore not recognized.

Moreover, the electronic control unit 130 may be configured to determine whether to use the hand gesture recognition function according to an input signal from the input unit 100. In other words, upon receiving an input signal for starting or terminating the hand gesture recognition function, the electronic control unit 130 may be configured to operate the image capture unit 110 to start or terminate the capturing images. In particular, the image capture unit 110 may be operated to capture an activity area in which one hand of the user moves.

In addition, the electronic control unit 130 may be configured to select a vehicle equipment operation, that corresponds to the recognized hand gesture generate a control signal based on the selected vehicle equipment operation, and provide the operation that the passenger wants to perform. Examples of vehicle equipment operations that the passenger may select include answering and hanging up the phone, play, stop, and mute music, volume up and down, air conditioner on and off, heater on and off, sun visor manipulation, and the like.

The output unit 140 may include a touch screen, a speaker, and vehicle equipment to be operated, such as a mobile phone, a music player, an air conditioner, a heater, and a sun visor. The output unit 140, operated by the ECU, may be configured to display the content of a vehicle equipment operation on the screen.

Figure 2:
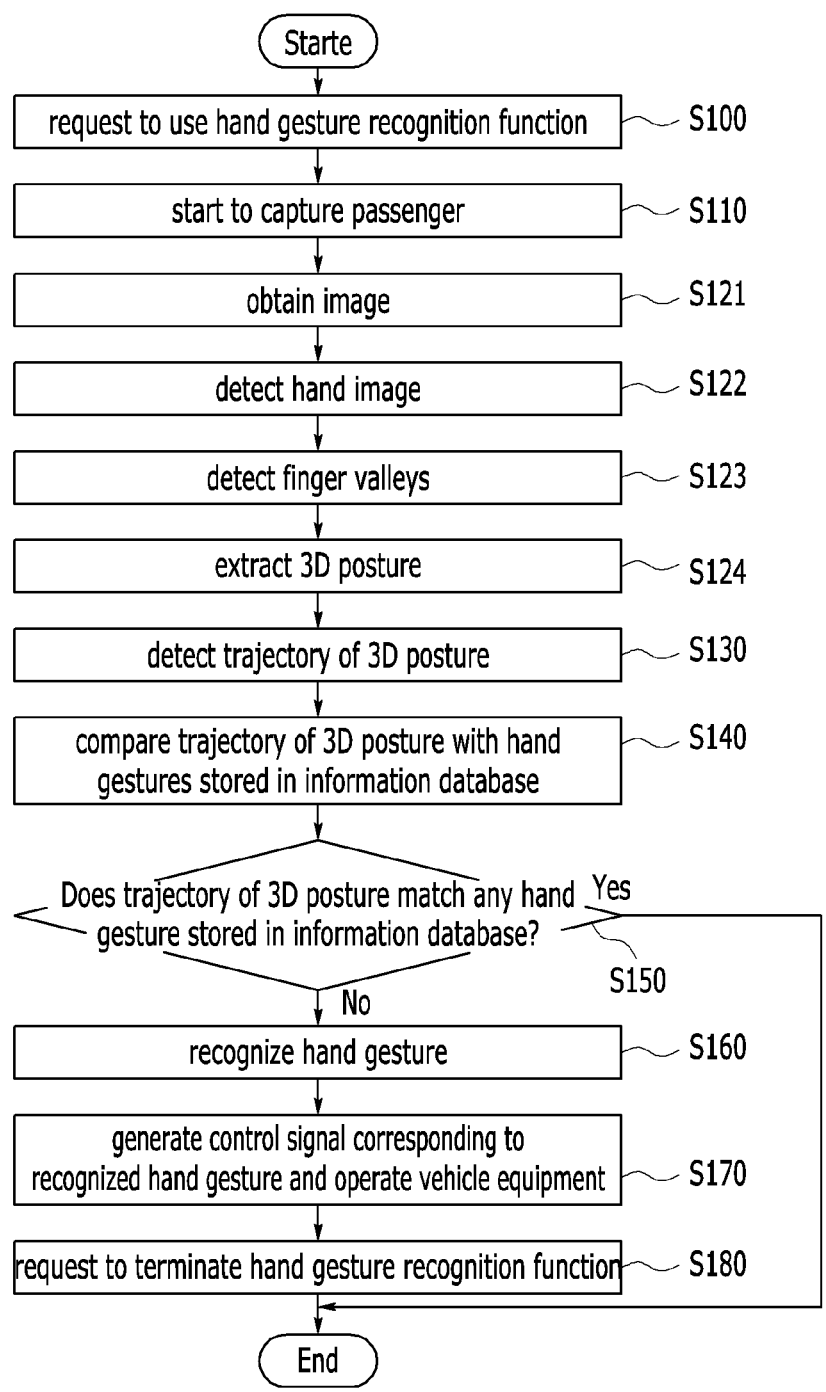
FIG. 2 is an exemplary flowchart of a method for manipulating a user interface within a vehicle using finger valleys according to an exemplary embodiment of the present invention.

FIG. 2 is an exemplary flowchart of a method for manipulating a user interface using finger valleys in accordance with an exemplary embodiment of the present invention. Referring to FIG. 2, the ECU may be configured to receive a request to use the hand gesture recognition function via an input unit 100 (S100). Then, upon receiving the request to use the hand gesture recognition function from the passenger, the electronic control unit 130 may be configured to start capturing images using the image capture unit 110 (S110). The captured image may be delivered to the electronic control unit 130, and accumulated and stored in the image storage unit 150 (S121).

Further, the electronic control unit 130 may be configured to detect a hand gesture using an image input from the image capture unit 110 and images stored in the image storage unit 150. This will be described in detail below. Specifically, the electronic control unit 130 may be configured to detect a hand image using a color image or an infrared image (S122). When using a color image, a hand image may be detected by extracting skin color or motion. When using infrared images, a hand image may be detected by extracting an image as bright as or brighter than skin color, or by detecting a differential image of a motion.

Then, the electronic control unit 130 may be configured to extract a contour from the hand image, and detect fingers, the center of the hand and finger valleys (S123). Points with high curvature on the contour may be detected as the fingers, and the center of gravity or center point of the hand image may be defined as the center of the hand. Finger valleys may be defined by backward curvature detection by detecting the curvature of the fingertips. In other words, the finger valleys may be detected based on the inflection points of the contour. Once finger valleys are defined, the electronic control unit 130 may be configured to determine whether the palm is approaching, moving away, moving up-down and left-right, rotating etc. based on the distances between the finger valleys and two-dimensional spatial arrangement thereof, and extract a 3D posture of the hand. Then, the trajectory of the 3D posture may be detected. (S130). When required, the trajectory of a 3D posture may be obtained by other methods Additionally, the electronic control unit 130 may be configured to determine whether a hand gesture matching the detected trajectory of the 3D posture is stored in the information database 120 (S140). In response to determining there is a matching hand gesture stored in the information database 120, the electronic control unit 130 may be configured to recognize the stored hand gesture as a hand gesture of the passenger (S160). Alternatively, when no matching hand gesture is stored in the information database 120, the trajectory of the 3D posture of the passenger may be rendered unidentifiable and therefore not recognized.

Afterwards, the electronic control unit 130 may be configured to select a vehicle equipment operation that corresponds to the recognized hand gesture by referencing the information database 120. The electronic control unit 130 may be configured to generate a control signal based on the selected vehicle equipment operation, and provide the operation that the passenger wants to perform (S170). Such vehicle equipment operations may include operations of equipment, such as an in-vehicle air conditioner and an audio system, and may also be applicable to the operations of delivering, duplicating, storing, and modifying information like content, media, etc.

An operation result may be displayed via the output unit 140, and the user interface using hand gesture recognition may be completed based on whether the ECU receives a request to terminate the hand gesture recognition function (S180).

The exemplary embodiment of the present invention may accomplish cost reduction since a passenger's hand gesture may be extracted by a 2D camera. Moreover, the exemplary embodiment of the present invention may improve reliability in the recognition of hand postures and motions since the degree of freedom of hand posture increases and a constant distance may be maintained between finger valleys regardless of hand posture. Further, the exemplary embodiment of the present invention may provide improved accuracy in recognition of various hand gestures since hand postures, such as tilting or overturning the hand, as well as up-down/left-right motions of the hand, may be extracted.

While this invention has been described in connection with what is presently considered to be exemplary embodiments, it is to be understood that the invention is not limited to the disclosed embodiments. On the contrary, it is intended to cover various modifications and equivalent arrangements included within the spirit and scope of the accompanying claims.

DESCRIPTION OF SYMBOLS

| | |
|---|---|
| 100: input unit | 110: image capture unit |
| 120: information database | 130: electronic control unit |
| 140: output unit | 150: image storage unit |
| 160: timer | |

What is claimed is:

1. A method for manipulating a user interface within a vehicle using finger valleys, the method comprising:
    receiving, by a controller, a captured image;
    detecting, by the controller, finger valleys from the captured image;
    recognizing, by the controller, a hand gesture using the finger valleys;
    determining, by the controller whether a request to use a hand gesture recognition function has been received, prior to the receiving of a captured image; in response to determining a request to use the hand gesture recognition function, receiving, by the controller the captured image and selecting by the controller a vehicle equipment operation that corresponds to the recognition hand gesture.

2. The method of claim 1, wherein the detecting of finger valleys from the captured image and recognizing of a hand gesture using the finger valleys includes:
    recognizing, by the controller, a hand image from the captured image;
    detecting, by the controller, finger valleys from the hand image;
    extracting, by the controller, a three-dimensional (3D) posture from the finger valleys;
    generating, by the controller, the trajectory of the 3D posture; and
    recognizing, by the controller, a hand gesture from the trajectory of the 3D posture.

3. The method of claim 2, wherein the recognizing of a hand gesture from the trajectory of the 3D posture includes:
    detecting, by the controller, whether a hand gesture matching the trajectory of the 3D posture is stored in an information database;
    in response to detecting a matching hand gesture stored in the information database, recognizing, by the controller, the trajectory of the 3D posture as a hand gesture.

4. The method of claim 1, further comprising:
    determining, by the controller, whether a request to terminate the hand gesture recognition function has been received; and
    in response to determining a request to terminate the hand gesture recognition function, terminating, by the controller, the hand gesture recognition function.

5. A system for manipulating a user interface in a vehicle using finger valleys, the system comprising:
    an image capture unit configured to capture images; and
    a controller configured to:
    receive a captured image from the image capture unit;
    store the captured image in an image storing unit;
    detect finger valleys from the captured image;
    recognize a hand gesture using the finger valleys;
    determine whether a request to use a hand gesture recognition function has been received prior to the receiving of a captured image;
    receive the captured image in response to determining a request to use the hand gesture recognition function;
    select a vehicle equipment operation that corresponds to the recognized hand gesture; and
    operate vehicle equipment operations based on an input signal from the image capture unit and accumulated image information stored in the image storage unit.

6. The system of claim 5, wherein the controller is further configured to:
    recognize a hand image from the captured image;
    detect finger valleys from the hand image;
    extract a three-dimensional (3D) posture from the finger valleys;
    generate the trajectory of the 3D posture; and
    recognize a hand gesture from the trajectory of the 3D posture.

7. The system of claim 6, wherein the controller is further configured to:
    detect whether a hand gesture matching the trajectory of the 3D posture is stored in an information database;
    recognize the trajectory of the 3D posture as a hand gesture in response to detecting a matching hand gesture stored in the information database.

8. The method of claim 5, wherein the controller is further configured to:
    determine whether a request to terminate the hand gesture recognition function has been received; and
    terminate the hand gesture recognition function in response to determining a request to terminate the hand gesture recognition function.

9. The method of claim 5, wherein the controller is further configured to:
    display the content of the selected vehicle equipment operation via an output unit.

10. A non-transitory computer readable medium containing program instructions executed by controller, the computer readable medium comprising:
    program instructions that control an image capture unit to capture images;
    program instructions that receive a captured image from the image capture unit;
    program instructions that store the captured image in an image storing unit;
    program instructions that detect finger valleys from the captured image;

program instructions that recognize a hand gesture using the finger valleys;

program instructions that determine whether a request to use a hand gesture recognition function has been received prior to the receiving of a captured image;

program instructions that receive the captured image in response to determining a request to use the hand gesture recognition function;

program instructions that select a vehicle equipment operation that corresponds to the recognized hand gesture; and program instructions that operate vehicle equipment operations based on an input signal from the image capture unit and accumulated image information stored in the image storage unit.

11. The non-transitory computer readable medium of claim 10, further comprising:

program instructions that recognize a hand image from the captured image;

program instructions that detect finger valleys from the hand image;

program instructions that extract a three-dimensional (3D) posture from the finger valleys;

program instructions that generate the trajectory of the 3D posture; and program instructions that recognize a hand gesture from the trajectory of the 3D posture.

12. The non-transitory computer readable medium of claim 11, further comprising:

program instructions that detect whether a hand gesture matching the trajectory of the 3D posture is stored in an information database;

program instructions that recognize the trajectory of the 3D posture as a hand gesture in response to detecting a matching hand gesture stored in the information database.

13. The non-transitory computer readable medium of claim 10, further comprising:

program instructions that determine whether a request to terminate the hand gesture recognition function has been received; and program instructions that terminate the hand gesture recognition function in response to determining a request to terminate the hand gesture recognition function.

14. The non-transitory computer readable medium of claim 10, further comprising:

program instructions that display the content of the selected vehicle equipment operation via an output unit.

* * * * *